United States Patent
Choi et al.

(10) Patent No.: US 11,077,399 B2
(45) Date of Patent: Aug. 3, 2021

(54) DEHUMIDIFIER

(71) Applicant: SAMSUNG ELECTRONICS CO., LTD., Suwon-si (KR)

(72) Inventors: Jung Un Choi, Yongin-si (KR); Kwon Jin Kim, Suwon-si (KR); Hyeong Joon Seo, Suwon-si (KR); Kang Ho Choi, Yongin-si (KR); Seong Ryeol Myeong, Suwon-si (KR); Hyun Jin Bae, Hwaseong-si (KR); Moon Sun Shin, Suwon-si (KR); Jong Chul Ahn, Seoul (KR); Sung June Cho, Suwon-si (KR); Jae Hun Choi, Osan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 270 days.

(21) Appl. No.: 15/765,133

(22) PCT Filed: Sep. 29, 2016

(86) PCT No.: PCT/KR2016/010922
§ 371 (c)(1),
(2) Date: Mar. 30, 2018

(87) PCT Pub. No.: WO2017/057928
PCT Pub. Date: Apr. 6, 2017

(65) Prior Publication Data
US 2018/0290103 A1    Oct. 11, 2018

(30) Foreign Application Priority Data

Sep. 30, 2015   (KR) .................. 10-2015-0137282

(51) Int. Cl.
*B01D 53/26* (2006.01)
*F24F 3/14* (2006.01)
(Continued)

(52) U.S. Cl.
CPC .............. *B01D 53/265* (2013.01); *F24F 3/14* (2013.01); *F24F 13/20* (2013.01); *F24F 13/222* (2013.01);
(Continued)

(58) Field of Classification Search
CPC ........ F24F 13/222; F24F 2140/30; F24F 3/14; F24F 13/20; F24F 2013/228; B01D 53/265; B01D 2259/4508
See application file for complete search history.

(56) References Cited

U.S. PATENT DOCUMENTS 6,062,040 A *   5/2000   Bostic ................ B65D 81/2038
                                                            62/530
8,380,355 B2 *  2/2013   Mayleben ............. G01F 23/266
                                                            700/282
(Continued)

FOREIGN PATENT DOCUMENTS

| CN | 102510980 | 6/2012 |
|---|---|---|
| JP | 2004-181279 | 7/2004 |

(Continued)

OTHER PUBLICATIONS

"Piping and plumbing fitting" Wikipedia published Mar. 3, 2014 accessed at <https://en.wikipedia.org/w/index.php?title=Piping_and_plumbing_fitting&oldid=597946512> (Year: 2014).*
(Continued)

*Primary Examiner* — Stephen Hobson
(74) *Attorney, Agent, or Firm* — Staas & Halsey LLP

(57) ABSTRACT

Provided is a dehumidifier capable of preventing condensation from flowing to the outside of a water container when the dehumidifier is turned over or while the dehumidifier is moved, since a suction structure for suctioning the condensation and a discharge structure for discharging the condensation are improved. The dehumidifier comprises: a main
(Continued)

body having a suction port; a heat exchanger provided inside the main body and removing moisture in the air; and a water collection device for collecting the condensation generated in the heat exchanger, wherein the water collection device comprises: an auxiliary water container in which the condensation is collected; a housing for guiding the condensation to the auxiliary water container; a connection hose provided to have a bent part so as to connect the auxiliary water container and the housing; an upper water container detachably provided at the upper part of the main body so as to drain the condensation; and a pump for pumping, to the upper water container, the condensation collected in the auxiliary water container.

14 Claims, 15 Drawing Sheets

(51) Int. Cl.
  *F24F 13/20* (2006.01)
  *F24F 13/22* (2006.01)
  *F24F 140/30* (2018.01)
(52) U.S. Cl.
  CPC ...... *B01D 2259/4508* (2013.01); *F24F 2013/228* (2013.01); *F24F 2140/30* (2018.01)

(56) References Cited

U.S. PATENT DOCUMENTS

| | | | | |
|---|---|---|---|---|
| RE46,616 E * | 11/2017 | Muse | ............ | B01D 53/265 |
| 10,514,192 B2 * | 12/2019 | Ha | ............ | F25B 49/02 |
| 2005/0139552 A1 * | 6/2005 | Forsberg | ............ | E03B 3/28 |
| | | | | 62/635 |
| 2006/0278084 A1 * | 12/2006 | Kim | ............ | F24F 13/222 |
| | | | | 96/140 |
| 2007/0062370 A1 * | 3/2007 | Ahn | ............ | F24F 3/1423 |
| | | | | 95/115 |
| 2008/0240945 A1 * | 10/2008 | Jordan | ............ | F01C 21/10 |
| | | | | 417/410.1 |
| 2009/0272364 A1 * | 11/2009 | Vu | ............ | F02M 59/464 |
| | | | | 123/495 |
| 2012/0159972 A1 * | 6/2012 | Haryanto | ............ | F24F 5/0096 |
| | | | | 62/78 |
| 2012/0325343 A1 * | 12/2012 | Mayer | ............ | C02F 9/00 |
| | | | | 137/544 |
| 2013/0047662 A1 * | 2/2013 | Black | ............ | F24F 1/04 |
| | | | | 62/498 |
| 2014/0130888 A1 * | 5/2014 | Kaiser | ............ | F24F 13/222 |
| | | | | 137/15.01 |
| 2015/0184875 A1 * | 7/2015 | Lee | ............ | F24F 13/222 |
| | | | | 62/93 |
| 2016/0265795 A1 * | 9/2016 | Kopp | ............ | B01F 3/04 |
| 2016/0334118 A1 * | 11/2016 | Ahn | ............ | F24F 3/1405 |
| 2018/0231412 A1 * | 8/2018 | Newman | ............ | G01F 23/263 |
| 2018/0283767 A1 * | 10/2018 | Conley | ............ | F28F 17/005 |
| 2018/0372370 A1 * | 12/2018 | DeMonte | ............ | F24F 13/20 |
| 2019/0037780 A1 * | 2/2019 | Hutto | ............ | A01G 9/246 |
| 2019/0137124 A1 * | 5/2019 | McGarva | ............ | F24F 13/14 |
| 2019/0323714 A1 * | 10/2019 | Cui | ............ | F24F 13/30 |
| 2020/0003451 A1 * | 1/2020 | Yoon | ............ | F24F 13/20 |
| 2020/0056794 A1 * | 2/2020 | Lorang | ............ | F24F 3/1405 |
| 2020/0061532 A1 * | 2/2020 | Yoon | ............ | F24F 1/0083 |
| 2021/0063026 A1 * | 3/2021 | Kim | ............ | F24F 1/0076 |

FOREIGN PATENT DOCUMENTS

| | | |
|---|---|---|
| KR | 10-2007-0048464 | 5/2007 |
| KR | 10-2015-0028171 | 3/2015 |
| KR | 10-2015-0051015 | 5/2015 |
| KR | 10-2015-0075749 | 7/2015 |

OTHER PUBLICATIONS

International Search Report dated Jan. 2, 2017 in corresponding International Patent Application No. PCT/KR2016/010922.
Written Opinion of the International Searching Authority dated Jan. 2, 2017 in corresponding International Patent Application No. PCT/KR2016/010922.
Chinese Office Action dated Aug. 24, 2020 from Chinese Application No. 201680058040.9, 19 pages.
Chinese Office Action dated Mar. 26, 2021 from Chinese Application No. 201680058040.9, 23 pages.

* cited by examiner

[Fig. 1]
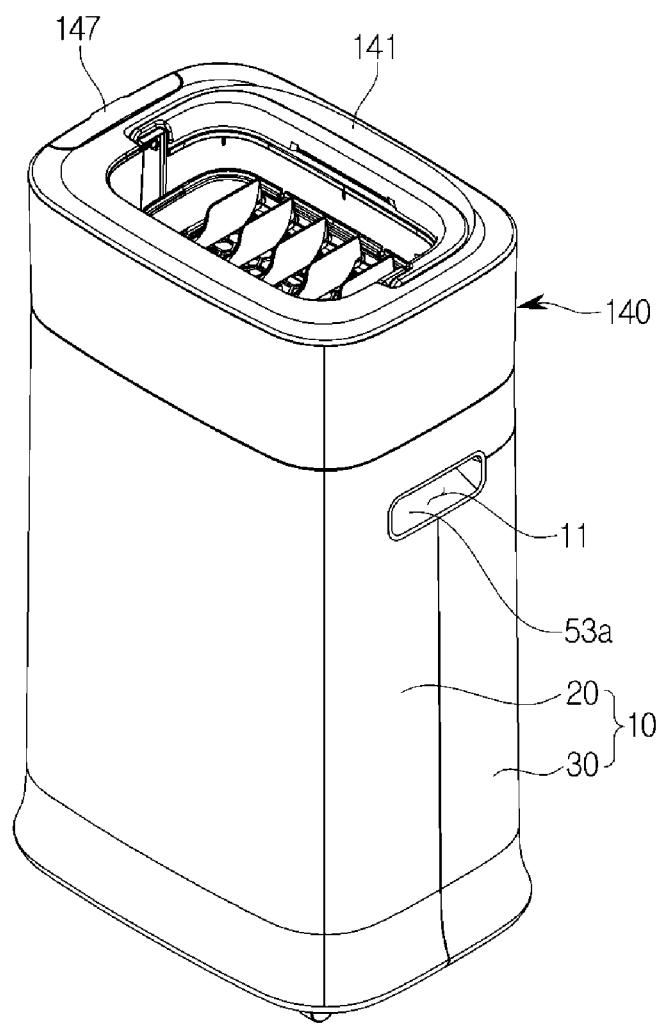

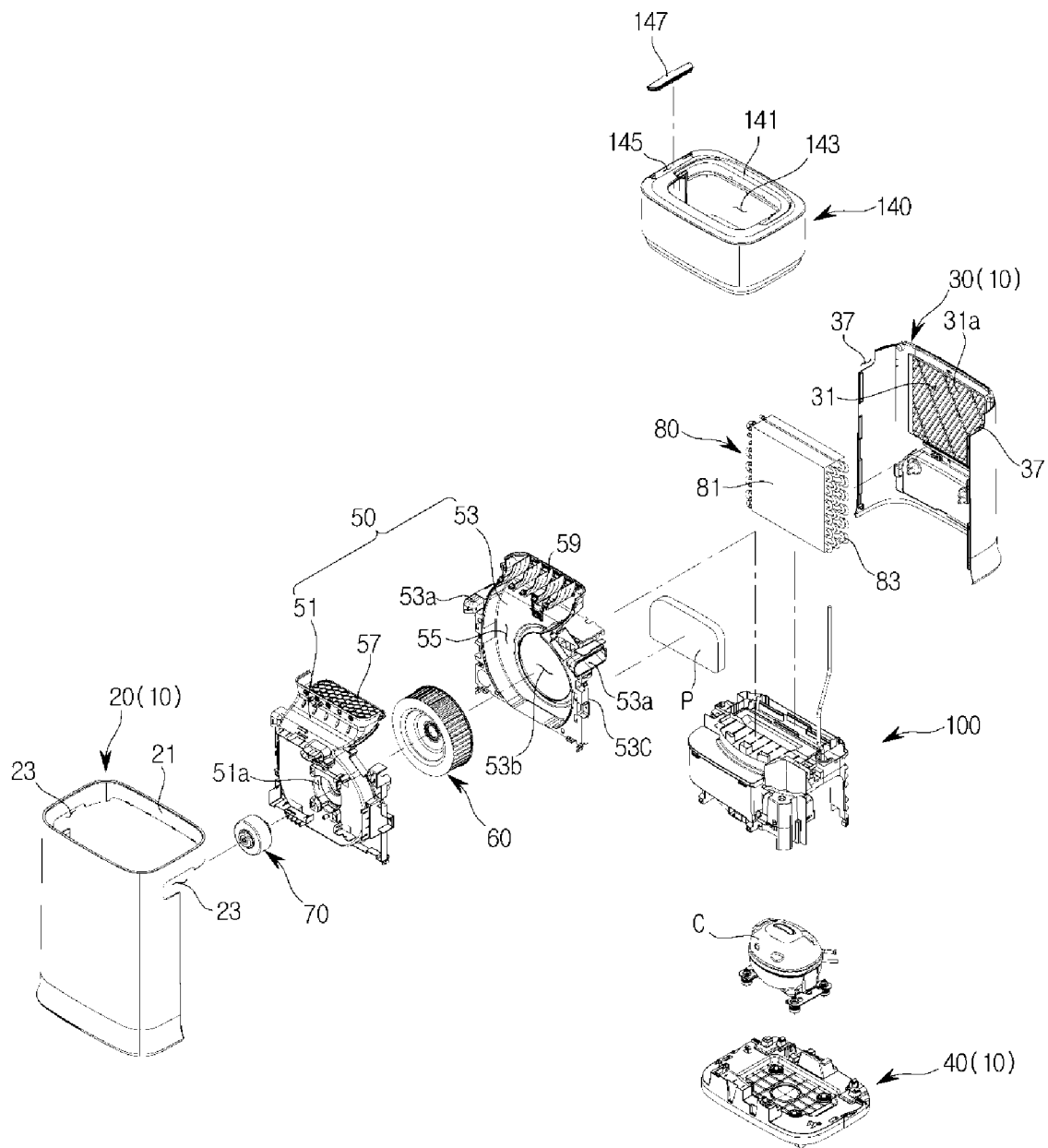
[Fig. 2]

[Fig. 3]
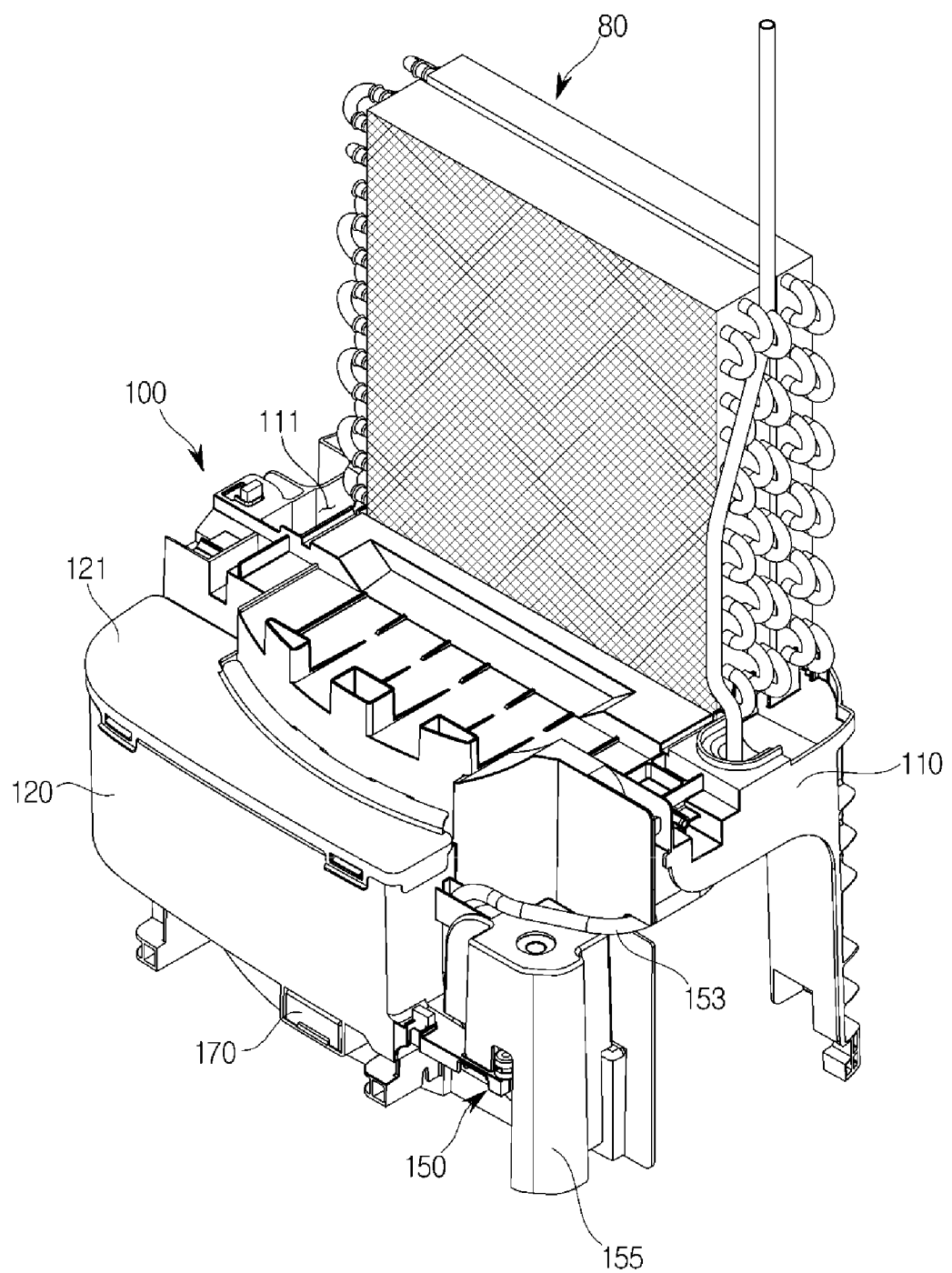

[Fig. 4]
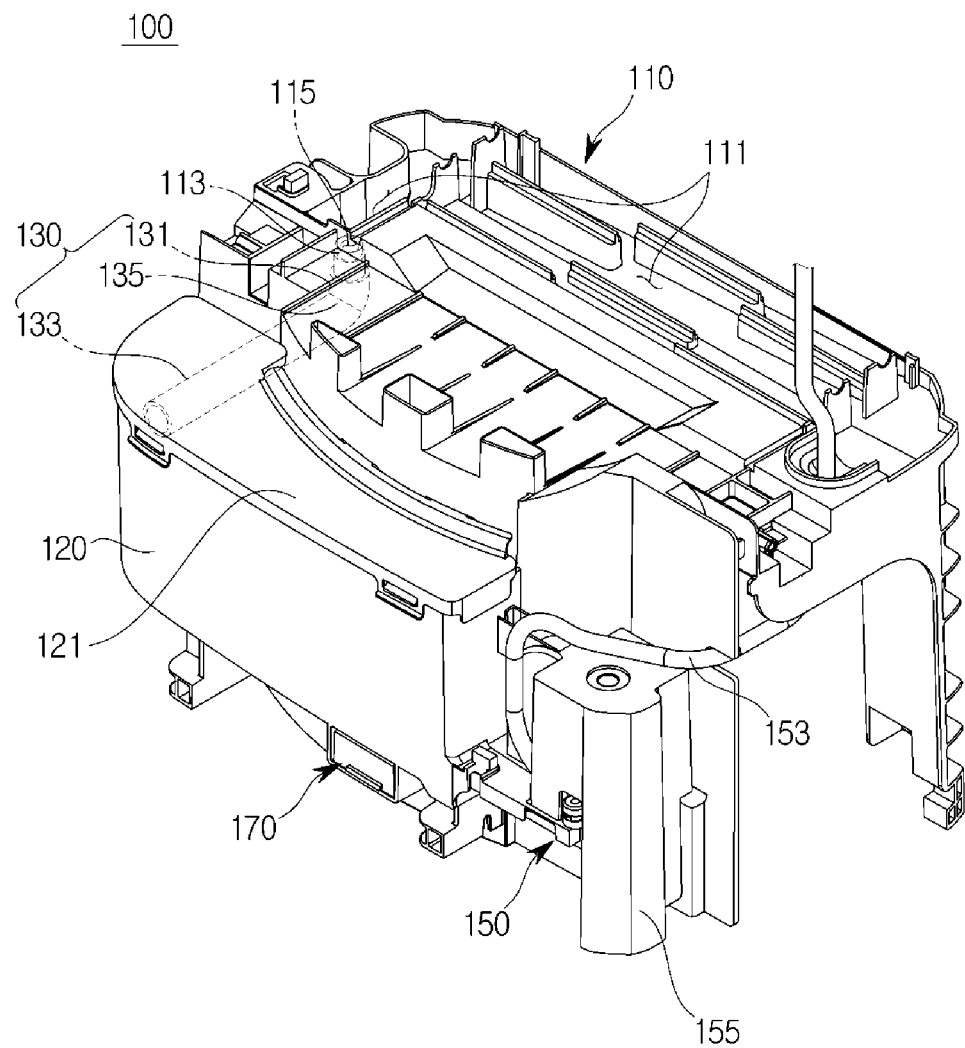

[Fig. 5]
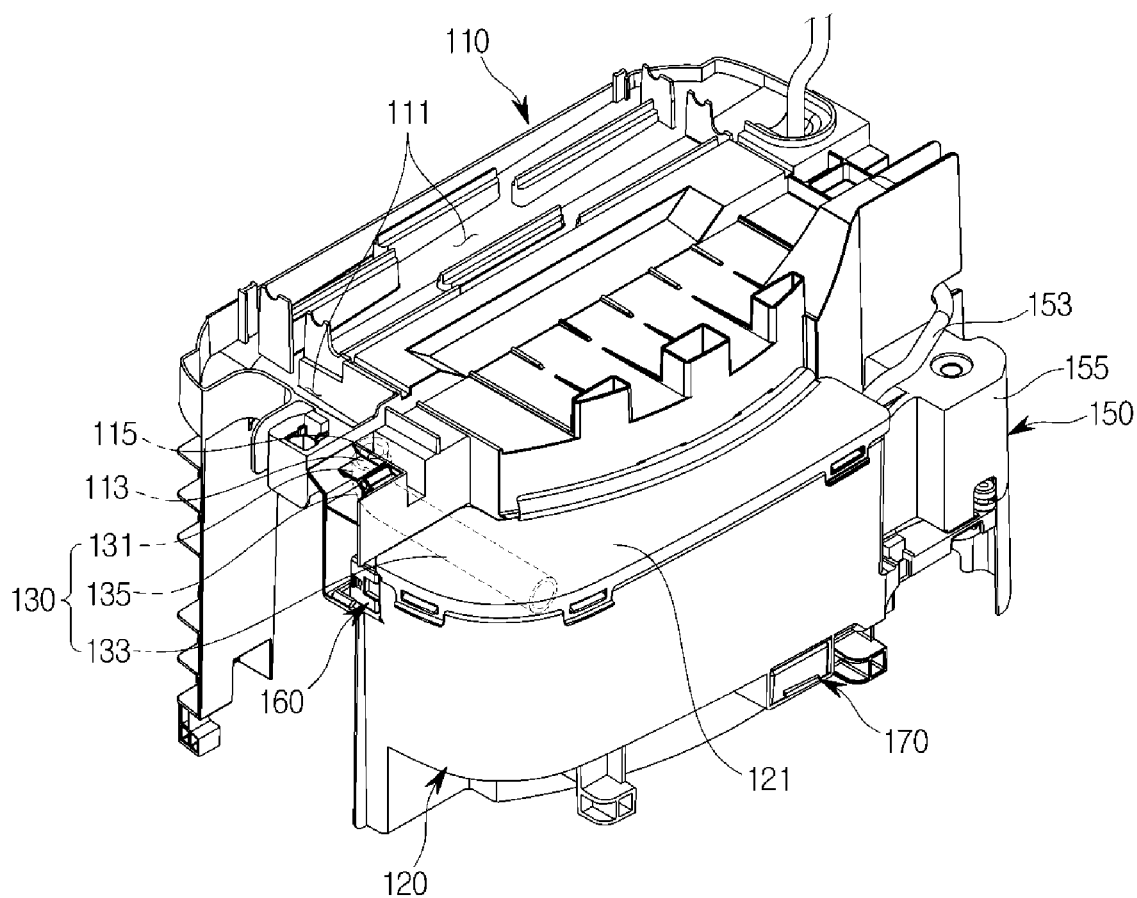

[Fig. 6]
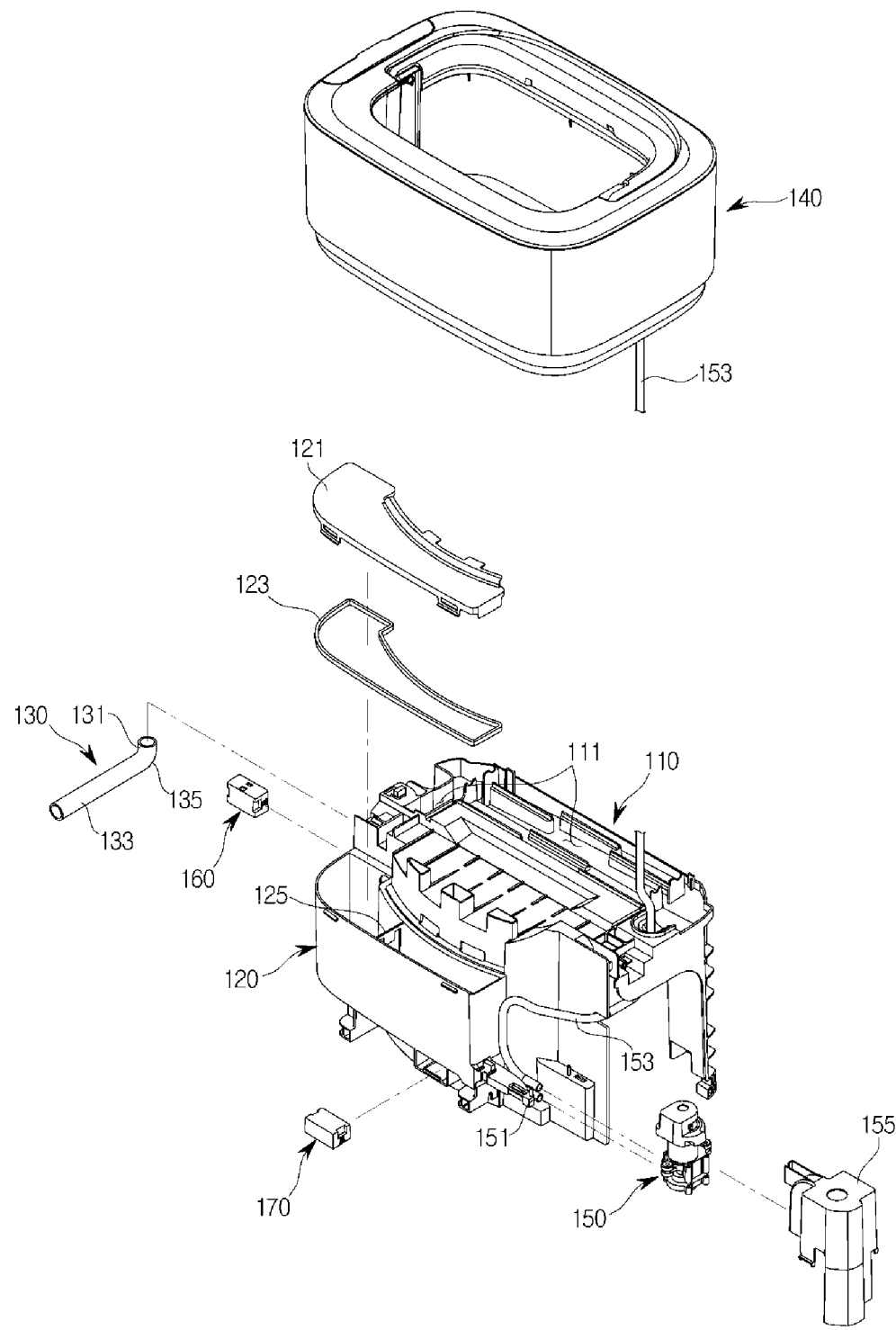

[Fig. 7]
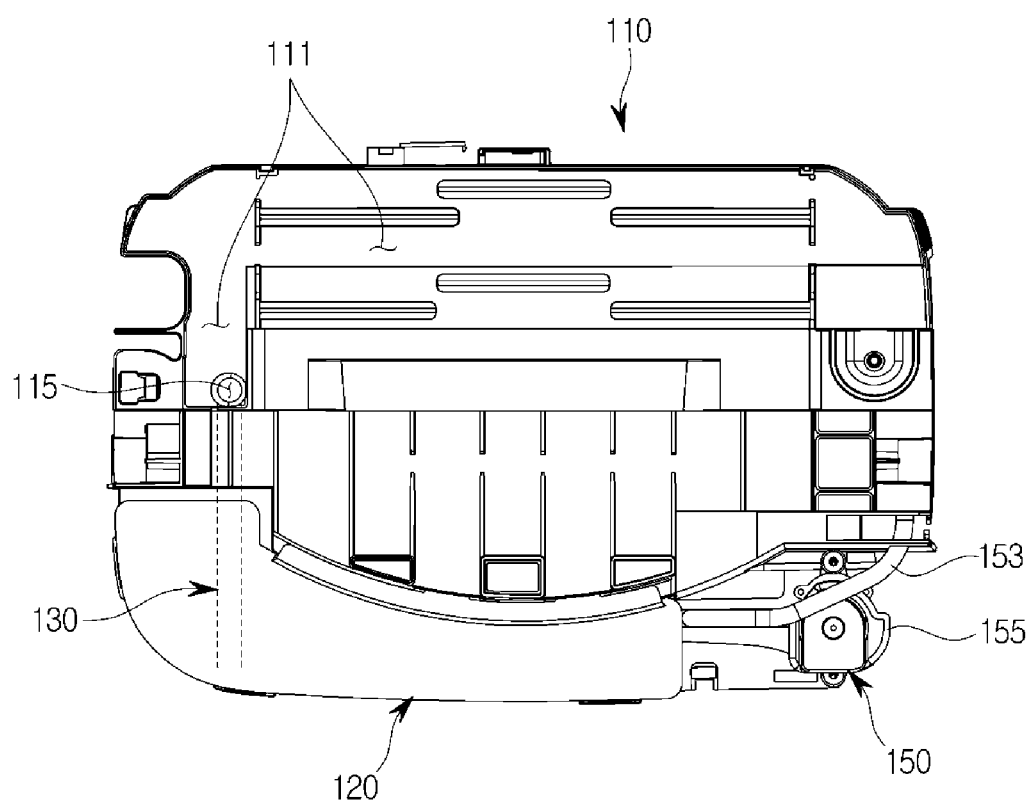

【Fig. 8】
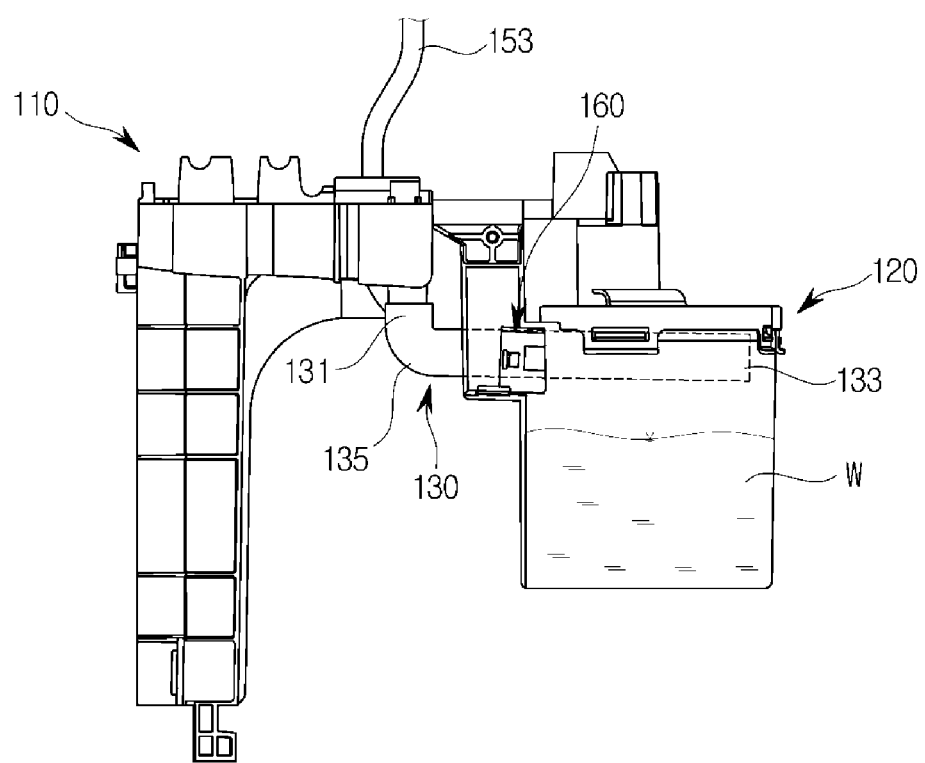

[Fig. 9]
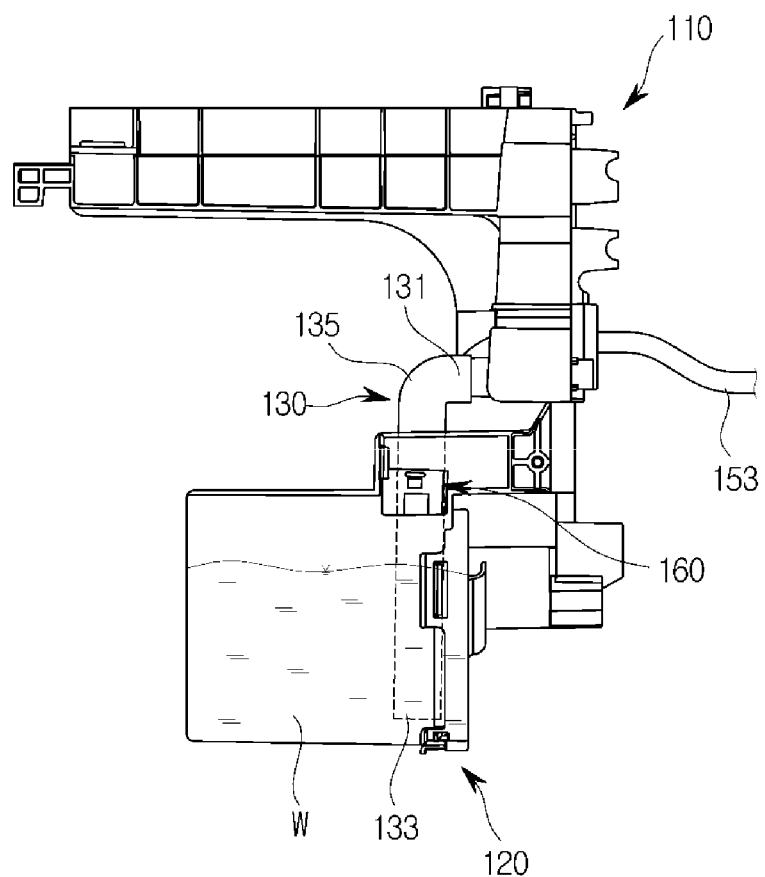

[Fig. 10]
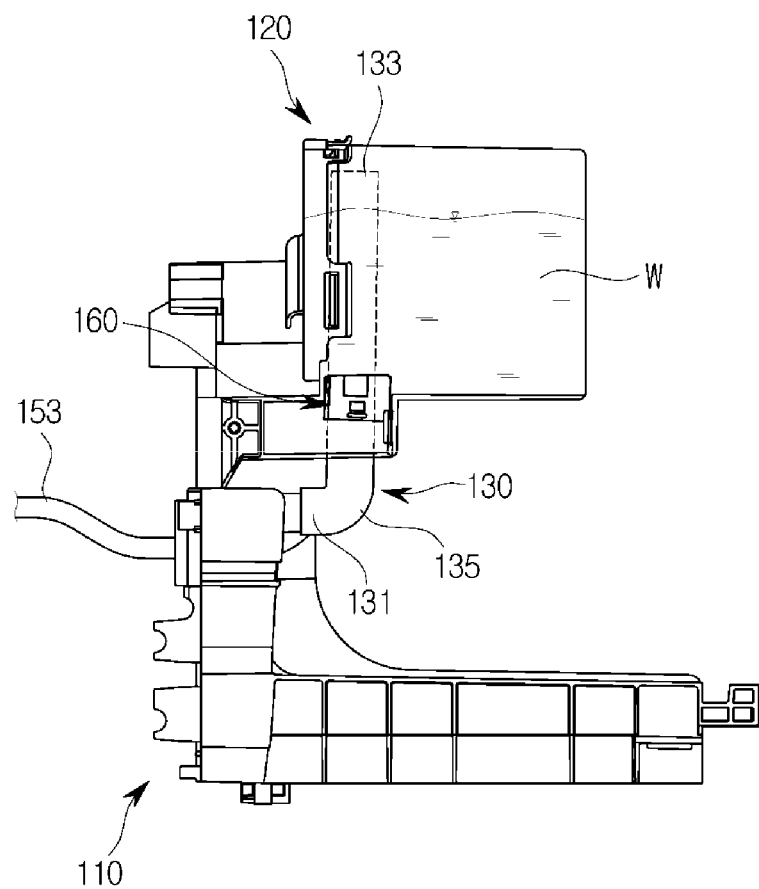

[Fig. 11]
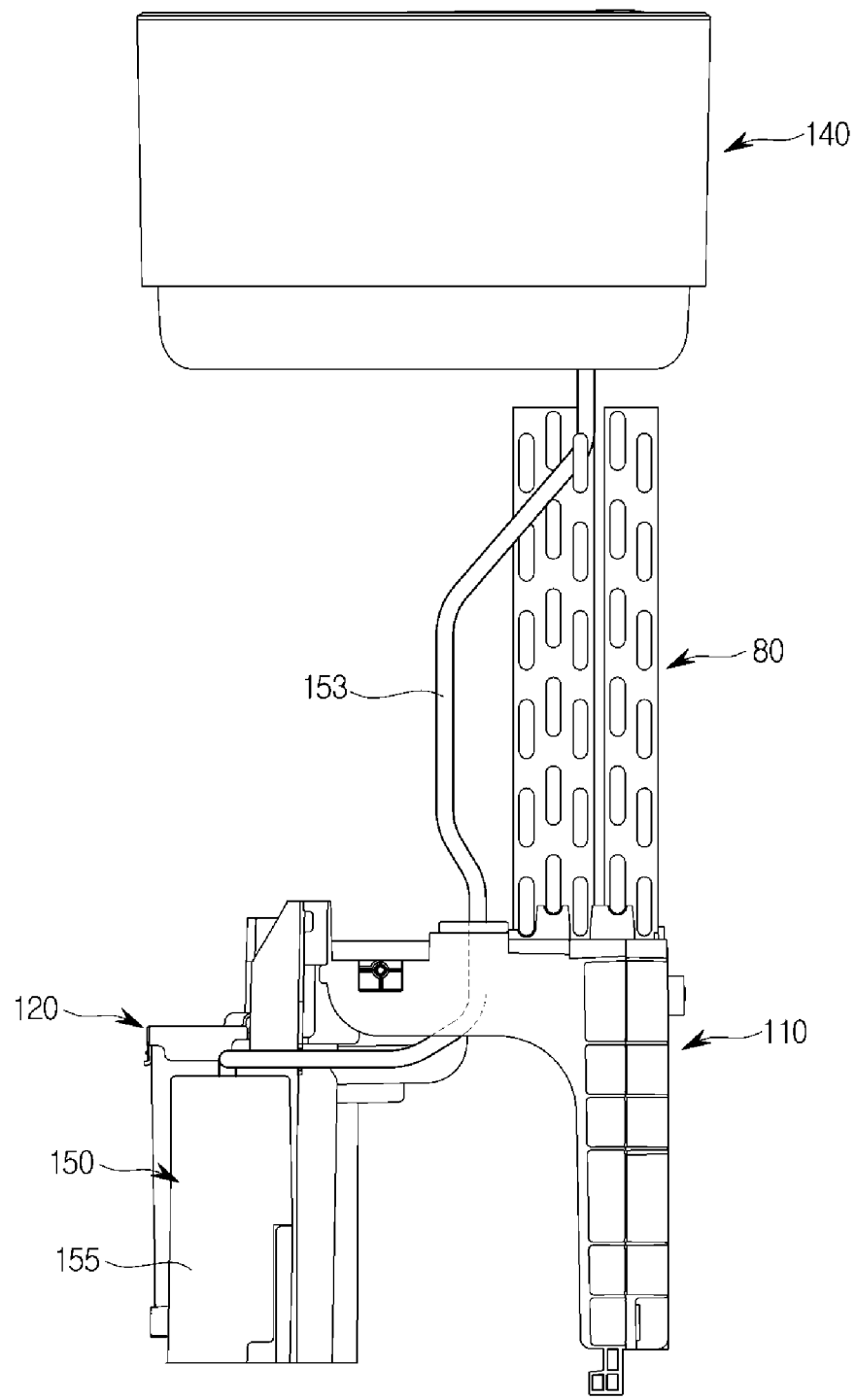

[Fig. 12]
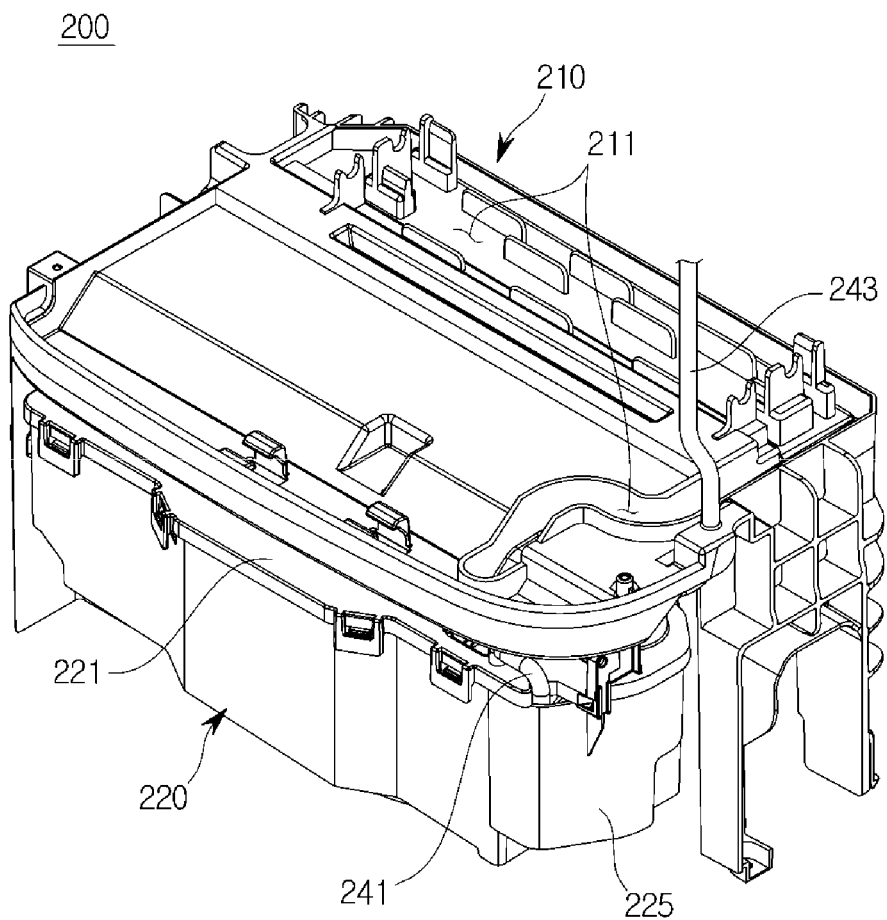

[Fig. 13]
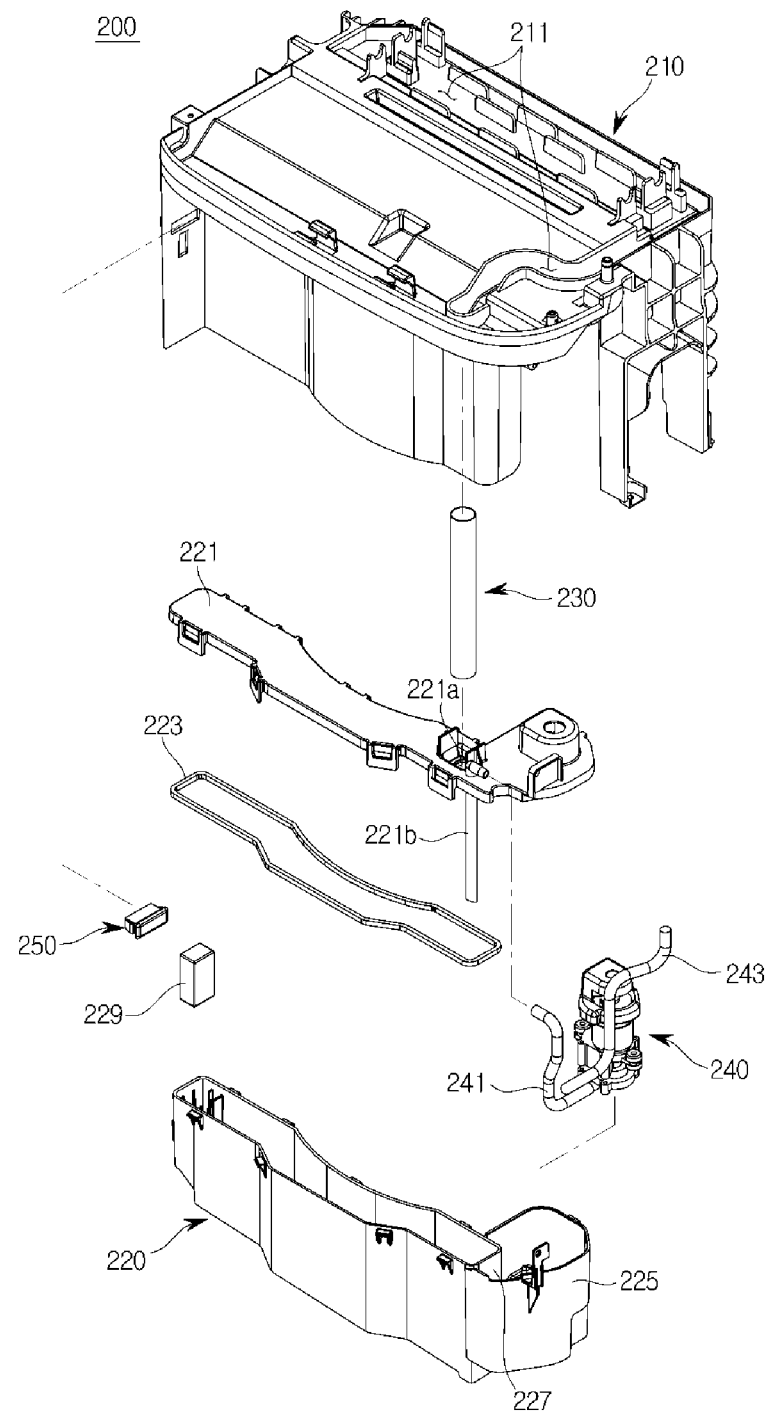

[Fig. 14]
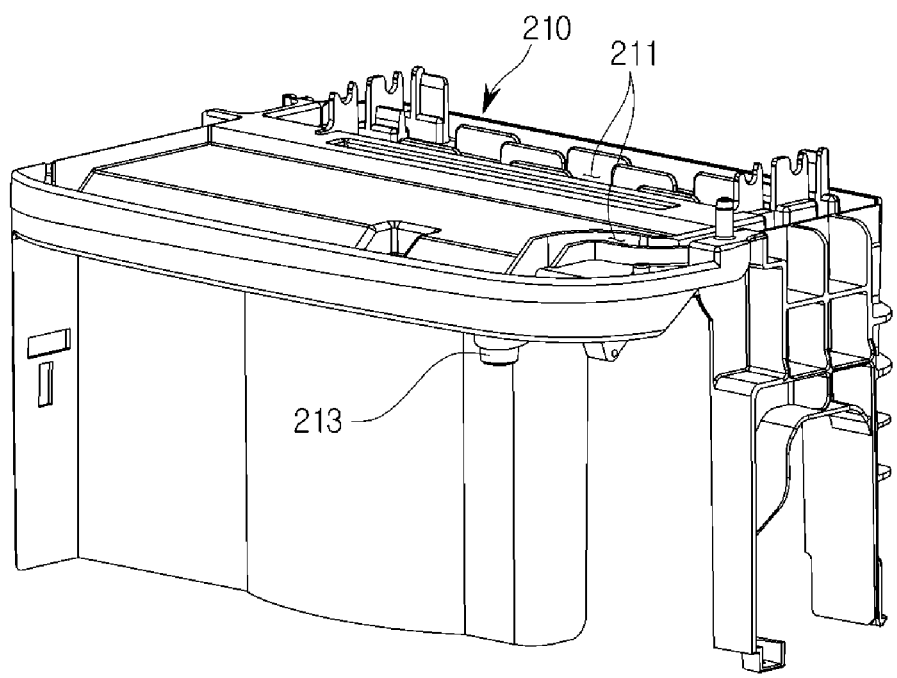

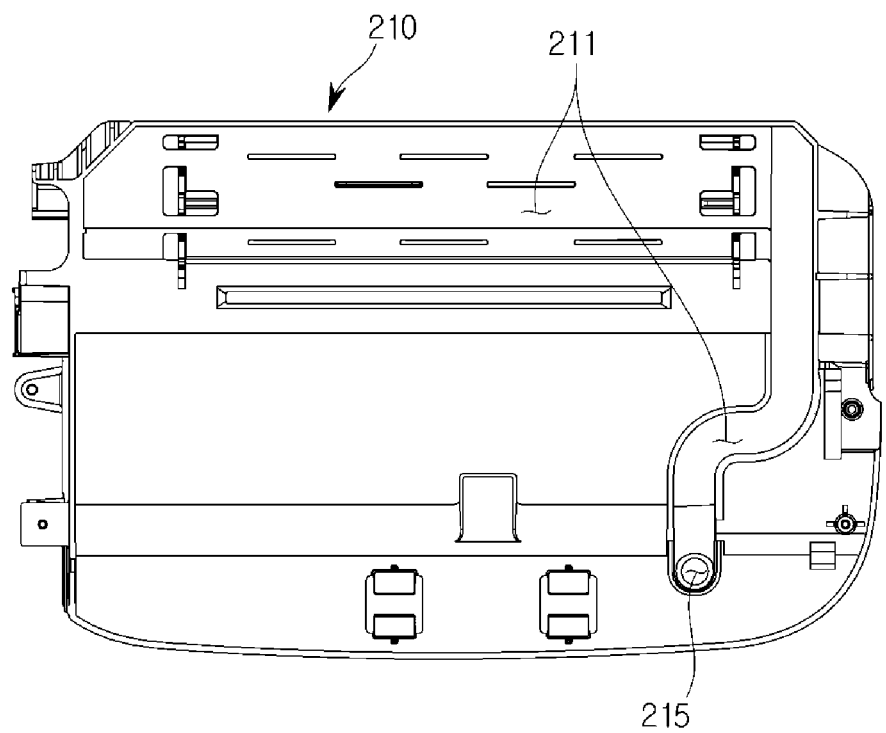
[Fig. 15]

DEHUMIDIFIER

CROSS-REFERENCE TO RELATED APPLICATIONS

This application is a National Phase Application under 35 U.S.C. § 371 of PCT International Patent Application No. PCT/KR2016/010922, filed Sep. 29, 2016 which claims foreign priority benefit under 35 U.S.C. § 119 to Korean Patent Application No. 10-2015-0137282 filed Sep. 30, 2015, the contents of which are incorporated herein by reference.

TECHNICAL FIELD

The present invention relates to a dehumidifier that removes moisture in air.

BACKGROUND ART

A dehumidifier is generally an appliance that removes moisture in the air.

The dehumidifier is mainly classified into a desiccant-type dehumidifier and a refrigeration-type dehumidifier, wherein the desiccant-type dehumidifier uses a chemical moisture absorbent to absorb or adsorb and remove moisture in air, and the refrigeration-type dehumidifier uses a refrigeration cycle device to cool the temperature of air to a dew point or less to condense moisture in air.

In the refrigeration-type dehumidifier, moist air in an indoor space is suctioned to the inside of a main body such that the suctioned air passes through a heat exchanger, which has a condenser and an evaporator, and through which a refrigerant flows, to reduce moisture of the air, and then the dehumidified air is discharged to the indoor space to reduce moisture in the indoor space.

That is, the refrigeration-type dehumidifier uses a method, with which atmospheric air loses its heat by evaporating a liquid refrigerant in the evaporator so that the temperature of the evaporator is lowered while the refrigerant evaporates and the temperature of air passing through the evaporator is also lowered.

Thus, as atmospheric temperature of the evaporator decreases, moisture in the air is condensed into dewdrops on the surface of the evaporator.

The dehumidifier generally has a water container, in which condensate on the surface of the evaporator is stored, on a lower portion or lateral side of the main body.

The water container is provided on the lower portion or lateral side of the main body in a detachably-mounted manner. This is because, when condensate is fully collected in the water container, a user can separate the water container from the main body, discard the condensate from the water container, and then re-mount the empty water container on the main body.

However, since the water container is provided on an upper end thereof with a suction port into which the condensate is suctioned and a discharge port through which the condensate is discharged, when the dehumidifier is turned over or while the dehumidifier is being moved, problems may occur in that the condensate in the water container overflows through the suction or discharge port, or the condensate overflowing the water container infiltrates into electronic parts of the dehumidifier.

DISCLOSURE

Technical Problem

One aspect of the present invention provides a dehumidifier capable of preventing condensate from being discharged from a water container when the dehumidifier is turned over or while the dehumidifier is being moved by improving a suction structure into which the condensate is suctioned and a discharge structure through which the condensate is discharged.

Technical Solution

A dehumidifier according to an embodiment of the present invention includes: a main body having a suction port; a heat exchanger disposed in the main body to remove moisture in air; and a water collection device configured to collect condensate generated in the heat exchanger, wherein the water collection device includes: an auxiliary water container in which the condensate is collected; a housing configured to guide the condensate toward the auxiliary water container; a connection hose having a bent part and configured to connect the auxiliary water container and the housing; an upper water container detachably mounted on an upper portion of the main body to drain the condensate therefrom; and a pump configured to pump the condensate collected in the auxiliary water container into the upper water container.

The housing may be provided on a lower portion of the heat exchanger, and the housing may include: a guide path provided on an upper portion of the housing to guide so that the condensate is collected into the auxiliary water container; and a connector having a connection hole therein and provided to extend downward from the guide path to be connected to the connection hose.

The auxiliary water container may be integrally provided with the housing.

An upper portion of the auxiliary water container may be open and the opened upper portion may be covered by a cover, and a gasket may be provided between the cover and the auxiliary water container to closely seal the inside of the auxiliary water container.

A filter configured to filter foreign matter in the condensate before the condensate collected in the auxiliary water container is supplied to the pump may be provided in the auxiliary water container.

The connection hose may include: a first connection hose having an end connected to the connector and the other end extending in a downward direction perpendicular to an upper surface of the housing; a second connection hose having an end connected to the first connection hose and the other end extending forward to be connected to the auxiliary water container; and the bent part connecting the first connection hose and the second connection hose.

The other end of the second connection hose may extend to a position adjacent to a front side of the auxiliary water container through a rear side of the auxiliary water container.

The water collection device may further include: a full-water level sensor to detect a full-water level of the auxiliary water container; and a low-water level sensor to detect an amount of the condensate remaining in the auxiliary water container.

The pump may be provided on the housing to be located at the outside of the auxiliary water container.

The pump may be provided to be accommodated in a pump cover to block noise generated when the pump operates from being transferred to the outside.

The auxiliary water container and the pump may be connected by a pump suction hose which suctions the condensate collected in the auxiliary water container to the pump, and the pump and the upper water container may be connected by a pump discharge hose which discharges the condensate suctioned to the pump to the upper water container.

The main body may include a front case, a rear case coupled to a rear face of the front case, and a base provided on lower portions of the front and rear cases, and the suction port may be provided on the rear case.

A guide duct having a discharge port may be provided in the main body, and the guide duct may be provided with a flow path to guide so that moisture in air suctioned through the suction port is discharged to the discharge port after being condensed by the heat exchanger.

The guide duct may have a front guide duct and a rear guide duct coupled to a rear side of the front guide duct, and a blower fan may be provided between the front guide duct and the rear guide duct to allow the air suctioned through the suction port to be guided to the discharge port.

The upper water container may be provided to have a square shape having an opening at a center thereof, and the air discharged to the discharge port may be discharged to the outside through the opening.

Also, a dehumidifier according to an embodiment of the present invention includes: a main body having a suction port; a heat exchanger disposed in the main body to remove moisture in air; and a water collection device configured to collect condensate generated in the heat exchanger, wherein the water collection device includes: an auxiliary water container in which the condensate is collected; a housing configured to guide the condensate toward the auxiliary water container; a connection hose configured to connect the auxiliary water container and the housing; an upper water container detachably mounted on an upper portion of the main body to drain the condensate therefrom; a pump configured to pump the condensate collected in the auxiliary water container into the upper water container; and a pump receptacle integrally provided with the auxiliary water container and configured to accommodate to block the pump from the outside.

The housing may be provided on a lower portion of the heat exchanger, and the housing may include: a guide path provided on an upper portion of the housing to guide so that the condensate is collected into the auxiliary water container; and a connector having a connection hole therein and provided to extend downward from the guide path to be connected to the connection hose.

An upper portion of the auxiliary water container may be open and the opened upper portion may be covered by a cover, and a gasket may be provided between the cover and the auxiliary water container to closely seal the inside of the auxiliary water container.

A partition wall configured to block a condensate-collecting space and the pump receptacle may be provided in the auxiliary water container and noise generated when the pump operates may be blocked from being transferred to the outside by the cover and the gasket.

The cover may be provided with a through hole through which the connection hose passes to connect the auxiliary water container and the housing and a suction hose formed such that the condensate collected in the auxiliary water container is suctioned to the pump.

The suction hose and the pump may be connected by a pump suction hose, and the pump and the upper water container may be connected by a pump discharge hose which discharges the condensate suctioned to the pump to the upper water container.

The water collection device may further include a full-water level sensor to detect a full-water level of the auxiliary water container and the full-water level sensor may be provided in the auxiliary water container to detect a location of a float that vertically moves to correspond to the height of the condensate collected in the auxiliary water container.

Advantageous Effects

According to embodiments of the present invention, when a dehumidifier is turned over or while the dehumidifier is moved, condensate collected in an auxiliary water container can be prevented from being discharged therefrom.

Further, when condensate is fully collected in the auxiliary water container, a full level signal can be generated to allow the condensate to be pumped into an upper water container, thereby facilitating management of the amount of condensate and it is possible to use a dehumidifier without anxiety of the remaining condensate by sensing the condensate remaining in the auxiliary water container after being pumped into the upper water container.

Still further, foreign matter in condensate collected in the auxiliary water container can be prevented from being suctioned into a pump, noise of the pump can be blocked from being leaked to the outside.

DESCRIPTION OF DRAWINGS

FIG. 1 is a perspective view of a dehumidifier according to an embodiment of the present invention.

FIG. 2 is an exploded perspective view of the dehumidifier according to an embodiment of the present invention.

FIG. 3 is a view showing a water collection device and a heat exchanger of the dehumidifier according to an embodiment of the present invention.

FIG. 4 is a perspective view of the water collection device according to an embodiment of the present invention.

FIG. 5 is a view showing FIG. 4 at a different angle.

FIG. 6 is an exploded perspective view of the water collection device according to an embodiment of the present invention.

FIG. 7 is a plan view of the water collection device according to an embodiment of the present invention.

FIG. 8 is a view showing a state in which condensate is collected in an auxiliary water container according to an embodiment of the present invention.

FIG. 9 is a view showing a state in which the condensate in the auxiliary water container is prevented from leaking to the outside when the dehumidifier according to an embodiment of the present invention is turned over forward.

FIG. 10 is a view showing a state in which the condensate in the auxiliary water container is prevented from leaking to the outside when the dehumidifier according to an embodiment of the present invention is turned over rearward.

FIG. 11 is a view showing a state to which a pump and an upper water container are connected by a pump discharge hose according to an embodiment of the present invention.

FIG. 12 is a perspective view of a water collection device according to another embodiment of the present invention.

FIG. 13 is an exploded perspective view of the water collection device according to another embodiment of the present invention.

FIG. 14 is a view showing a housing of the water collection device according to another embodiment of the present invention.

FIG. 15 is a plan view of the water collection device according to another embodiment of the present invention.

MODES OF THE INVENTION

Hereinafter, embodiments of the present invention will be described in detail with reference to the accompanying drawings.

In the following, the terms "front side" and "front face" used herein denote directions toward the front side and front face with respect to a main body of a dehumidifier, and the terms "rear side" and "rear face" denote directions opposite the front side and front face.

Further, the term "upper portion" denotes an upper direction from the main body of the dehumidifier, and the term "lower portion" denotes a lower direction from the main body of the dehumidifier.

As illustrated in FIGS. 1 and 2, a dehumidifier includes a main body 10 forming an external appearance of the dehumidifier, a blower fan 60 disposed in the main body to forcedly flow air, a refrigeration cycle device that cools air suctioned into the main body 10 by the blower fan 60 to a dew point or less to condense moisture in the air, a guide duct 50 having a discharge port 57 through which the air suctioned into the main body 10 is discharged to the outside, and a water collection device 100 configured to collect the condensate W generated while the air suctioned into the main body 10 is cooled to the dew point or less.

The main body 10 may include a front case 20, a rear case 30 coupled to a rear face of the front case 20, and a base 40 provided on lower portions of the front and rear cases 20 and 30.

The front case 20 may include an upper container mounting part 21 provided at an upper portion thereof so that an upper water container 140, which will be described below, is detachably mounted, and a first opening 23 opened so that a grip 53a provided at the guide duct 50, which will be described below, is exposed to the outside.

The rear case 30 may be coupled to a rear face of the front case 20 and may include a suction port 31 through which external air is suctioned into the main body 10, and a second opening 37 that forms an opening 11 together with the first opening 23 of the front case 20 and is opened so that the grip 53a can be exposed to the outside.

The suction port 31 may be provided with a mesh filter 31a to filter and prevent foreign matter contained in air from being suctioned into the main body 10.

The base 40 is disposed on a lower portion of the main body 10, and a compressor C may be installed at an upper portion of the base 40.

The refrigeration cycle device is disposed in the main body 10 and is operated to cool the air suctioned into the main body 10 by the blower fan 60 to a dew point or less and condense moisture in the air, thereby removing the moisture.

The refrigeration cycle device may include the compressor C compressing a refrigerant, a condenser (heat exchanger 81) condensing the refrigerant to dissipate latent heat to the outside, an expansion valve (not shown) expanding the refrigerant, and an evaporator (cooler or heat exchanger 83) evaporating the refrigerant to absorb the external latent heat and thus condense moisture in ambient air.

Air suctioned through the suction port 31 may be cooled and dehumidified through the evaporator 83, re-heated and dried through the condenser 81, and discharged to the outside through the discharge port 57.

That is, the air suctioned into the main body 10 may be cooled to the dew point or less at the evaporator 83 so that moisture in the air is condensed, and the dried air may be heated while passing through the condenser 81. Thus, the heated air may be finally discharged to the outside of the main body 10 in a state in which it has lower relative humidity.

However, in addition to the method using the refrigeration cycle device, the dehumidifier can perform dehumidification by a method using an adsorbent.

In performing the dehumidification by a method using an adsorbent, when moisture is adsorbed onto the adsorbent, the adsorbed water may be evaporated by a heater, and the evaporated vapor may be condensed while passing through the heat exchanger.

A heat exchanger 80, which will be described below, is a unit that includes the condenser 81 and the evaporator 83.

The guide duct 50 guiding so that the air suctioned into the main body 10 and having passed through the heat exchanger 80 is discharged to the outside of the main body 10 may be provided in the main body 10.

The guide duct 50 may include a front guide duct 51 and a rear guide duct 53 coupled to a rear face of the front guide duct 51.

The front guide duct 51 may be provided with a motor mounting part 51a on which a drive motor 70 for driving the blower fan 60 is mounted. The rear guide duct 53 may be provided with the grip 53a, which is exposed to the outside through the opening 11 of the main body 10 so that a user can grip, a suction hole 53b through which the air suctioned into the suction port 31 and passed through the heat exchanger 80 is suctioned into the guide duct 50, and an electronic component-mounting part 53c on which a variety of electronic components P are mounted.

A flow path 55 may be provided in a space between the front guide duct 51 and the rear guide duct 53 and may guide to discharge the air, which is suctioned into the suction port 31 by the blower fan 60, to the outside. A discharge port 57 opened upward to discharge the air guided into the flow path 55 to the outside may be provided on an upper portion of the guide duct 50.

The discharge port 57 may be provided with a louver 59 for opening and closing the discharge port 57.

The blower fan 60 may be disposed on the flow path 55 provided between the front guide duct 51 and the rear guide duct 53, and may be connected to the drive motor 70 mounted on the front guide duct 51 and driven by the drive motor 70.

The main body 10 is provided with a water collection device 100 configured to collect the condensate W generated in the heat exchanger 80.

As illustrated in FIGS. 3 to 7, the water collection device 100 may include a housing 110 provided on a lower portion of the heat exchanger 80, an auxiliary water container 120 provided at the housing 110 to collect the condensate W, a connection hose 130 connecting the housing 110 and the auxiliary water container 120, an upper water container 140 detachably mounted onto an upper portion of the main body 10 to drain the condensate W, a pump 150 configured to pump the condensate W collected in the auxiliary water container 120 toward the upper water container 140, a full-water level sensor 160 configured to sense a full-water level of the condensate W collected in the auxiliary water container 120, and a low-water level sensor 170 configured to sense a low-water level of the condensate W collected in the auxiliary water container 120.

The housing 110 may have a guide path 111 guiding so that the condensate W, which is generated in the heat exchanger 80 provided on the housing 110, is collected in the auxiliary water container 120, and a connector 113 provided to extend downward from the guide path 111 to be connected to the connection hose 130.

The guide path 111 is provided on an upper surface of the housing 110 to guide so that the condensate W that is generated in the heat exchanger 80 and dropped is collected in the auxiliary water container 120.

A connection hole 115 is provided in the connector 113 extending downward from the guide path 111 so that the condensate W guided by the guide path 111 can be moved to the connection hose 130 through the connection hole 115.

The auxiliary water container 120 in which the condensate W is collected may be integrally provided with the housing 110 on a front face of the housing 110.

An upper portion of the auxiliary water container 120 is opened and covered by a cover 121, and a gasket 123 is provided between the cover 121 and the auxiliary water container 120 to closely seal the inside of the auxiliary water container 120.

Since the auxiliary water container 120 is internally sealed by the gasket 123, the condensate W collected in the auxiliary water container 120 cannot flow to the outside of the auxiliary water container 120 even when the dehumidifier is turned over.

A filter 125 configured to filter foreign matter in the condensate W before the condensate W collected in the auxiliary water container 120 is supplied to the pump 150 may be provided in the auxiliary water container 120.

The connection hose 130 connects the auxiliary water container 120 and the housing 110 so that the condensate W, which is generated in the heat exchanger 80 and guided by the guide path 111 of the housing 110, is guided into and collected in the auxiliary water container 120.

The connection hose 130 may include a first connection hose 131 having one end connected to the connector 113 and the other end extending in a downward direction perpendicular to an upper surface of the housing 110, a second connection hose 133 having one end connected to the first connection hose 131 and the other end extending toward the front side and connected to the auxiliary water container 120, and a bent part 135 connecting the first connection hose 131 and the second connection hose 133.

The other end of the second connection hose 133 having an end connected to the first connection hose 131 through the bent part 135 may extend to a position adjacent to a front face of the auxiliary water container 120 through a rear face of the auxiliary water container 120.

The other end of the second connection hose 133 may be provided to be spaced a specified distance from the front face of the auxiliary water container 120 so that the other end is not brought into contact with the front face.

The first connection hose 131 having a length in a vertical direction and the second connection hose 133 a length in a horizontal direction may be connected by the bent part 135 such that the connection hose 130 generally has an L shape.

As illustrated in FIG. 8, when the condensate W is collected in the auxiliary water container 120 and the dehumidifier is turned over forward or rearward, a problem may occur in that the condensate W collected in the auxiliary water container 120 overflows to the outside of the auxiliary water container 120.

However, since the auxiliary water container 120 is internally sealed by the gasket 123, the connection hose 130, which connects the housing 110 and the auxiliary water container 120 to allow the condensate W generated in the heat exchanger 80 to be collected in the auxiliary water container 120, is provided with the bent part 135, and the other end of the second connection hose 133 extends to a position adjacent to the front face of the auxiliary water container 120, the condensate W in the auxiliary water container 120 cannot overflow to the outside of the auxiliary water container 120 even when the dehumidifier is turned over forward or rearward.

Specifically, as illustrated in FIG. 9, when the dehumidifier is turned over forward, the condensate W collected in the auxiliary water container 120 has a lower level than the bent part 135 of the connection hose 130, and thus the condensate W can be prevented from overflowing to the outside through the connection hole 115 of the connector 113 connected to the first connection hose 131.

As illustrated in FIG. 10, when the dehumidifier is turned over rearward, the condensate W collected in the auxiliary water container 120 has a lower level than the other end of the second connection hose 133 extending to a position adjacent to the front face of the auxiliary water container 120, and thus the condensate W can be prevented from overflowing to the outside of the auxiliary water container 120 through the second connection hose 133.

As illustrated in FIGS. 1 and 2, the upper water container 140 may be detachably mounted on the upper portion of the main body 10.

The upper water container 140 may be provided with a grip part 141 so that a user can grip to detach the upper water container 140 from the main body 10.

The upper water container 140 may have a square shape with an opening 143 at a center thereof. The upper water container may be provided with a drain hole 145 to drain the condensate W supplied to the upper water container 140, and the drain hole 145 may be opened or closed by a drain hole cover 147.

The opening 143 formed at the center is provided at a position corresponding to the discharge port 57 of the guide duct 50 to allow air to be discharged to the outside of the main body 10 through the discharge port 57 and the opening 143.

As illustrated in FIG. 11, the upper water container 140 may be connected to the pump 150 via a pump discharge hose 153 so that the condensate W collected in the auxiliary water container 120 can be pumped by the pump 150 and moved to the upper water container 140 through the pump discharge hose 153.

Since the condensate W collected in the auxiliary water container 120 is moved to the upper water container 140 by the pump 150, a user can detach only the upper water container 140 from the main body 10 and discard the condensate W when the upper water container 140 is fully filled with the condensate W.

Although not illustrated in the drawings, the upper water container 140 may be provided with a sensor to indicate, to a user, that the upper water container 140 is fully filled with the condensate W. Further, the upper water container 140 may be formed of a transparent material in order for a user to see through the upper water container 140 from the outside to check the amount of the condensate W collected in the upper water container 140.

As illustrated in FIGS. 3 to 7, the pump 150 may be mounted on the housing 110 to pump the condensate W collected in the auxiliary water container 120 into the upper water container 140.

The pump 150 is mounted on the outside of the auxiliary water container 120, and may include a pump suction hose 151 connecting the auxiliary water container 120 and the pump 150, the pump discharge hose 153 connecting the pump 150 and the upper water container 140, and a pump cover 155 accommodating the pump 150.

The pump 150 may be supplied with the condensate W collected in the auxiliary water container 120 via the pump suction hose 151 connected to the auxiliary water container 120, and the condensate W supplied to the pump 150 may be moved to the upper water container 140 through the pump discharge hose 153.

The pump 150 may be mounted on the housing 110 to be accommodated in the pump cover 155, thereby blocking noise generated when the pump 150 operates from being transferred to the outside.

Although not illustrated in the drawings, in order to reduce the noise generated when the pump 150 operates, a sound-absorbing material may be attached to the outside of the pump 150 instead of the pump 150 being accommodated in the pump cover 155.

The water collection device 100 may further include the full-water level sensor 160 configured to sense the full-water level of condensate W collected in the auxiliary water container 120 and the low-water level sensor 170 configured to sense the low-water level of the condensate collected in the auxiliary water container.

When the amount of condensate collected in the auxiliary water container 120 exceeds a predetermined value, the full-water level sensor 160 sends a signal to activate the pump 150. The pump 150 pumps the condensate W collected in the auxiliary water container 120 into the upper water container 140 when the signal from the full-water level sensor 160 is received.

Although not illustrated in the drawings, the full-water level sensor 160 may be a capacitance sensor or a reed switch sensed by a magnet.

When the amount of the condensate W remaining in the auxiliary water container 120 reaches the predetermined value, the low-water level sensor 170 sends a signal to the pump 150. The pump 150 pumps until the condensate remaining in the auxiliary water container 120 has moved to the upper water container 140 and then stops operating when the signal from the low-water level sensor 170 is received.

Subsequently, a description of another embodiment of the water collection device, in which an auxiliary water container is separated from a housing will be made with reference to FIGS. 12 to 15.

As illustrated in FIGS. 12 to 15, a water collection device 200 may include a housing 210 provided on a lower portion of a heat exchanger, an auxiliary water container 220 in which condensate is collected, a connection hose 230 connecting the housing 210 and the auxiliary water container 220, an upper water container detachably mounted on an upper portion of a main body 10 to drain the condensate, a pump 240 configured to pump the condensate collected in the auxiliary water container 220 toward the upper water container, and a full-water level sensor 250 configured to sense a full-water level of the condensate collected in the auxiliary water container 220.

Although not illustrated in the drawings, similar to the water collection device 100 illustrated in FIGS. 2 and 3, the heat exchanger is disposed on an upper portion of the housing 210.

Although not illustrated in the drawings, the upper water container may have the same configuration and location as that of the upper water container 140 illustrated in FIGS. 1 and 2.

The housing 210 may include a guide path 211 guiding so that the condensate, which is generated in the heat exchanger, is collected in the auxiliary water container 220, and a connector 213 provided to extend downward from the guide path 211 to be connected to the connection hose 230.

The guide path 211 is provided on an upper surface of the housing 210 and guides so that the condensate that is generated in the heat exchanger and dropped is collected in the auxiliary water container 220.

A connection hole 215 may be provided in the connector 213 extending downward from the guide path 211 and the condensate guided by the guide path 211 may be moved to the connection hose 230 through the connection hole 215.

The auxiliary water container 220 in which condensate is collected may be separately provided from the housing 210 on a lower portion of the housing 210.

An upper portion of the auxiliary water container 220 is open and the opened upper portion is covered by a cover 221, and a gasket 223 is provided between the cover 221 and the auxiliary water container 220 to closely seal the inside of the auxiliary water container 220.

Since the auxiliary water container 220 is internally sealed by the gasket 223, the condensate collected in the auxiliary water container 220 cannot flow to the outside of the auxiliary water container 220 even when the dehumidifier is turned over.

The cover 221 may be provided with a through-hole 221a passing through the connection hose 230 connecting the housing 210 and the auxiliary water container 220, and a suction hose 221b connecting the auxiliary water container 220 and a pump suction hose 221b of the pump 240, which will be described below, to allow the condensate collected in the auxiliary water container 220 to be suctioned into the pump 240.

The auxiliary water container 220 may be provided with a pump receptacle 225 that is integrally provided with the auxiliary water container 220 and accommodates to block the pump 240 from the outside.

The pump receptacle 225 may be provided in the auxiliary water container 220, and the inside of the auxiliary water container 220 may be provided with a partition wall 227 to separate a condensate-collecting space and the pump receptacle 225.

When the pump 240 is accommodated in the pump receptacle 225, operation noise of the pump 240 may be prevented from being transferred to the outside by the partition wall 227, the cover 221, and the gasket 223.

Although not illustrated in the drawings, a filter configured to filter foreign matter in the condensate before the condensate collected in the auxiliary water container 220 is supplied to the pump 240 may be provided in the auxiliary water container 220.

The connection hose 230 connects the auxiliary water container 220 and the housing 210 so that the condensate, which is generated in the heat exchanger and guided by the guide path 211 of the housing 210, is moved to and collected in the auxiliary water container 220.

The connection hose 230 may be provided such that an end thereof is connected to the connector 213, and the other end thereof extends into the auxiliary water container 220 through the through-hole 221a of the cover 221 of the auxiliary water container 220.

The pump 240 may be accommodated by the pump receptacle 225 provided in the auxiliary water container 220 to pump the condensate collected in the auxiliary water container 220 into the upper water container.

The pump 240 is installed to be accommodated in the pump receptacle 225 in the auxiliary water container 220, and may include a pump suction hose 241 connecting the auxiliary water container 220 and the pump 240, and a pump discharge hose 243 connecting the pump 240 and the upper water container.

The pump 240 may be supplied with the condensate collected in the auxiliary water container 220 through the pump suction hose 241 connected to the auxiliary water container 220, and the condensate supplied to the pump 240 may be moved to the upper water container through the pump discharge hose 243.

The water collection device 200 may further include the full-water level sensor 250 configured to sense a full-water level of the condensate collected in the auxiliary water container 220.

When the amount of the condensate collected in the auxiliary water container 220 exceeds a predetermined value, the full-water level sensor 250 sends a signal to activate the pump 240. The pump 240 pumps the condensate collected in the auxiliary water container 220 into the upper water container when the signal from the full-water level sensor 250 is received.

The full-water level sensor 250 may be a reed switch, and a float 229 that vertically moves to correspond to the height of the condensate collected in the auxiliary water container 220 may be provided in the auxiliary water container 220.

A magnet is embedded in the float 229 so that the float 229 rises to correspond to the height of the condensate, which is sensed by the full-water level sensor 250 when the auxiliary water container 220 is fully filled with the condensate.

The full-water level sensor 250 may be a capacitance sensor instead of the reed switch.

Although not illustrated in the drawings, the water collection device 200 may be provided with a low-water level sensor to sense the amount of the condensate remaining in the auxiliary water container 220.

While embodiments of the dehumidifier have been described as having a particular shape, direction, or the like with reference to the accompanying drawings, an ordinary person in the art should appreciate that modifications and changes may be made to the embodiments, and such modifications and changes should be construed as being included in the scope of the present invention.

The invention claimed is:

1. A dehumidifier comprising:
a main body having a suction port to suction air;
a heat exchanger disposed in the main body to remove moisture from the air from the suction port; and
a water collection device configured to collect condensate generated in the heat exchanger,
wherein the water collection device comprises:
an auxiliary water container in which the condensate is collected;
a housing configured to guide the condensate toward the auxiliary water container;
a connection hose having a bent part and configured to connect to the housing and to a rear side of the auxiliary water container; the bent part being configured such that the condensate collected in the auxiliary water container has a lower level than the bent part;
an upper water container detachably mounted on an upper portion of the main body to drain the condensate therefrom; and
a pump configured to pump the condensate collected in the auxiliary water container into the upper water container, and
wherein a guide duct having a discharge port is provided in the main body, and the upper water container is provided to have a square shape having an opening at a center thereof, and the air guided to the discharge port is discharged to the outside through the opening.

2. The dehumidifier of claim 1, wherein the housing is provided on a lower portion of the heat exchanger, and the housing comprises: a guide path provided on an upper portion of the housing to guide so that the condensate is collected into the auxiliary water container; and a connector having a connection hole therein and provided to extend downward from the guide path to be connected to the connection hose.

3. The dehumidifier of claim 2, wherein the auxiliary water container is integrally provided with the housing.

4. The dehumidifier of claim 3, wherein an upper portion of the auxiliary water container is open and the opened upper portion is covered by a cover, and a gasket is provided between the cover and the auxiliary water container to closely seal the inside of the auxiliary water container.

5. The dehumidifier of claim 4, wherein a filter configured to filter foreign matter in the condensate before the condensate collected in the auxiliary water container is supplied to the pump is provided in the auxiliary water container.

6. The dehumidifier of claim 2, wherein the connection hose includes:
a first connection hose having an end connected to the connector and an other end extending in a downward direction perpendicular to an upper surface of the housing;
a second connection hose having an end connected to the first connection hose and an other end extending forward to be connected to the rear side of the auxiliary water container; and
the bent part connecting the first connection hose and the second connection hose.

7. The dehumidifier of claim 6, wherein the other end of the second connection hose extends to a position adjacent to a front side of the auxiliary water container through the rear side of the auxiliary water container.

8. The dehumidifier of claim 1, wherein the water collection device further includes: a full-water level sensor to detect a full-water level of the auxiliary water container; and a low-water level sensor to detect an amount of the condensate remaining in the auxiliary water container.

9. The dehumidifier of claim 1, wherein the pump is provided on the housing to be located at the outside of the auxiliary water container.

10. The dehumidifier of claim 9, wherein the pump is provided to be accommodated in a pump cover to block noise generated when the pump operates from being transferred to the outside.

11. The dehumidifier of claim 10, wherein the auxiliary water container and the pump are connected by a pump suction hose which suctions the condensate collected in the auxiliary water container to the pump, and the pump and the upper water container are connected by a pump discharge hose which discharges the condensate suctioned to the pump to the upper water container.

12. The dehumidifier of claim 1, wherein the main body includes a front case, a rear case coupled to a rear face of the front case, and a base provided on lower portions of the front and rear cases, and the suction port is provided on the rear case.

13. The dehumidifier of claim 12, wherein the guide duct is provided with a flow path to guide the moisture in the air suctioned through the suction port to be discharged to the discharge port after being condensed by the heat exchanger.

14. The dehumidifier of claim 13, wherein the guide duct has a front guide duct and a rear guide duct coupled to a rear side of the front guide duct, and a blower fan is provided between the front guide duct and the rear guide duct to allow the air suctioned through the suction port to be guided to the discharge port.

* * * * *